United States Patent
Modi et al.

(10) Patent No.: US 10,778,448 B2
(45) Date of Patent: Sep. 15, 2020

(54) CERTIFICATE STATUS DELIVERY THROUGH A LOCAL ENDPOINT

(71) Applicant: DigiCert, Inc., Lehi, UT (US)

(72) Inventors: Sanjay Modi, Santa Clara, CA (US); Richard Andrews, Menlo Park, CA (US)

(73) Assignee: DigiCert, Inc., Lehi, UT (US)

( * ) Notice: Subject to any disclaimer, the term of this patent is extended or adjusted under 35 U.S.C. 154(b) by 0 days.

(21) Appl. No.: 16/112,350

(22) Filed: Aug. 24, 2018

(65) Prior Publication Data
US 2019/0097817 A1 Mar. 28, 2019

Related U.S. Application Data

(62) Division of application No. 14/097,045, filed on Dec. 4, 2013.

(51) Int. Cl.
| | |
|---|---|
| *H04L 29/06* | (2006.01) |
| *H04L 9/32* | (2006.01) |
| *H04L 29/08* | (2006.01) |

(52) U.S. Cl.
CPC ............ *H04L 9/3268* (2013.01); *H04L 9/321* (2013.01); *H04L 63/1483* (2013.01); *H04L 67/2842* (2013.01)

(58) Field of Classification Search
CPC ............... H04L 9/3268; H04L 67/2842; H04L 63/1483; H04L 9/321
See application file for complete search history.

(56) References Cited

U.S. PATENT DOCUMENTS

| | | | | |
|---|---|---|---|---|
| 2005/0193204 A1* | 9/2005 | Engberg | ................ | H04L 9/3247 713/175 |
| 2008/0133907 A1* | 6/2008 | Parkinson | ........... | H04L 63/0823 713/158 |
| 2010/0023756 A1* | 1/2010 | Ben-Itzhak | ......... | H04L 63/0823 713/156 |
| 2011/0004763 A1* | 1/2011 | Sato | ....................... | H04L 63/06 713/175 |

(Continued)

OTHER PUBLICATIONS

Santesson, S. et al. X.509 Internet Public Key Infrastructure Online Certificate Status Protocol—OCSP. RFC Editor [online], Jun. 2013 [retrieved on Feb. 5, 2020]. Retrieved from the Internet: <https://www.rfc-editor.org/info/rfc6960>.

*Primary Examiner* — Amir Mehrmanesh
(74) *Attorney, Agent, or Firm* — Knobbe, Martens, Olson & Bear, LLP

(57) ABSTRACT

Techniques are disclosed for locally distributing online certificate status protocol (OCSP) responses to a client computer. A certificate authority (CA) proactively sends OCSP responses to an agent application (e.g., an antivirus application configured to handle OCSP responses) residing in the client computer. The agent application stores the OCSP responses in a cache. Thereafter, when a browser application sends an OCSP request to the CA, the agent application intercepts the request and determines whether a corresponding OCSP response is locally cached. If so, the agent application sends the cached OCSP response to the browser application. If not, the agent application retrieves the corresponding OCSP response from the CA and sends the response to the browser application.

19 Claims, 6 Drawing Sheets

(56) References Cited

U.S. PATENT DOCUMENTS

| | | | | |
|---|---|---|---|---|
| 2011/0154017 A1* | 6/2011 | Edstrom | ............ | H04L 63/0823 |
| | | | | 713/151 |
| 2011/0154026 A1* | 6/2011 | Edstrom | ............ | H04L 63/0823 |
| | | | | 713/158 |
| 2011/0161663 A1* | 6/2011 | Nakhjiri | ............ | H04L 63/0823 |
| | | | | 713/158 |

* cited by examiner

CERTIFICATE STATUS DELIVERY THROUGH A LOCAL ENDPOINT

PRIORITY CLAIM

This application is a divisional of U.S. patent application Ser. No. 14/097,045, filed on Dec. 4, 2013, which is incorporated herein in its entirety and for all purposes.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the invention generally relate to techniques for computer security. More specifically, techniques are disclosed for efficiently sending online certificate status protocol responses to relying parties (e.g., client browser applications) by distributing the responses to the relying parties locally.

Description of the Related Art

Various techniques exist for determining the validity of a digital certificate. For example, online certificate status protocol (OCSP) is a method for delivering a status of a digital certificate to a requesting client. Under OCSP, a web server may present a digital certificate to a browser application. In turn, the browser application ensures that the certificate is valid before accepting the certificate. To do so, the browser application requests an OCSP response from a certificate authority (CA) that issued the certificate. When the CA receives the OCSP request, the CA sends a digitally signed OCSP response to the browser application. Such a response indicates whether the certificate is valid, invalid, revoked, etc. Once signed, an OCSP response is valid and correct for a specified period of time, e.g., seven days. Typically, the browser application maintains an OCSP response in a cache for the validity period.

In some cases, the browser application may experience substantial delays in receiving an OCSP response. For instance, delays may occur within the network of the user's Internet Service Provider (ISP), the ISP of the CA, or in any of the routers or networks of the Internet between the ISPs of the user and the CA. Such delays may occur because the browser application needs to communicate with the CA that serves the OCSP response. Latency between such connections (and between other network segments in and outside the cloud) delays the browser application from receiving an OCSP response.

SUMMARY

One embodiment presented herein includes a method for distributing certificate status validity messages. The method generally includes pre-populating a cache accessible to an agent application with one or more certificate status validity messages received from a certificate authority. The method also includes intercepting, via the agent application, a certificate status validity request from a browser application for a digital certificate. The method also includes determining whether the cache stores a certificate status validity message corresponding to the certificate status validity request. Upon determining that the corresponding certificate status validity message is stored in the cache, the corresponding certificate status validity message is sent to the browser application.

Another embodiment presented herein includes a method for distributing certificate status validity messages to an agent application executing on a client computer. The method generally includes identifying, via a processor, a set of certificate validity messages to send to a client computer. The method also includes generating the set of certificate status validity messages. The method also includes sending the certificate validity messages to an agent application executing on the client computer. The client computer stores the certificate status validity messages in a cache.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
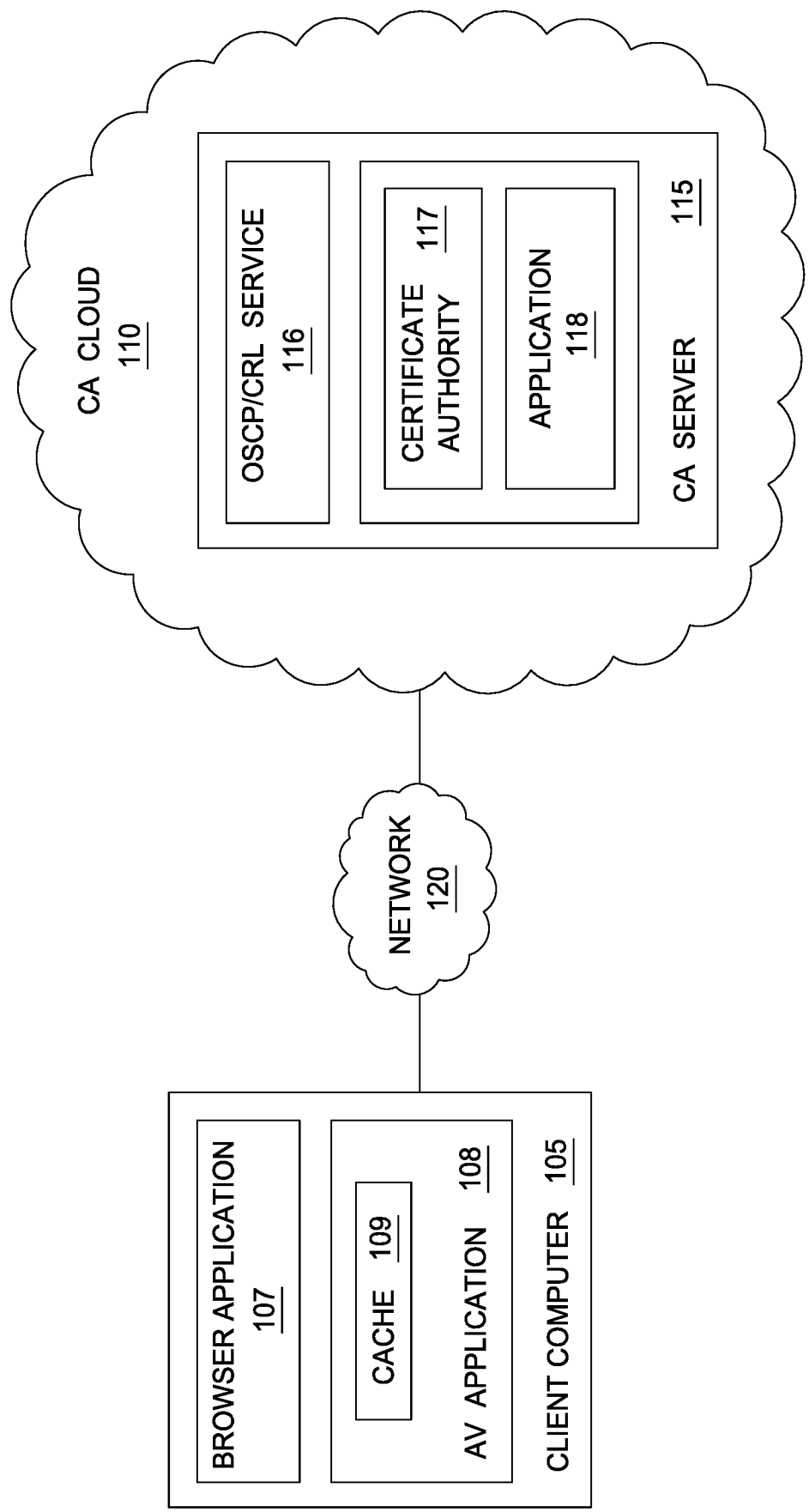
FIG. 1 illustrates an example computing environment, according to one embodiment.

Embodiments presented herein provide techniques for delivering validity messages for digital certificates through a local application on a client computer. More specifically, the techniques disclosed herein deliver certificate validity messages, such as online certificate status protocol (OCSP) responses or certificate revocation lists (CRLs), to a requesting client (e.g., a web browser application) via a push model using local software that monitors other running applications and intercepts system calls made by the running applications. Using this push model, the client machine may cache certificate validity messages before the status of a corresponding certificate is requested.

For example, an antivirus (AV) application may be configured to cache OCSP responses as well as intercept OCSP requests. In addition to maintaining malware definitions, the AV application may be configured to also receive OCSP responses sent by a certificate authority (CA). The AV application stores the OCSP responses in a cache. The AV application may be configured to detect when the browser application sends an OCSP request to the CA to determine the status of a given digital certificate and intercept the request. The AV application determines whether an OCSP response corresponding to the request is cached locally, and if so, sends the cached response to the browser application. If not, the AV application requests an OCSP response from the CA. Once a response is received, the AV application sends the response to the browser application and stores the response in the cache.

Advantageously, monitoring the activity of a browser application of the client and intercepting requests for a status of a digital certificate bypasses a need to modify the code or behavior of the browser application. That is, the local application (e.g., antivirus or security application) intercepts the request and sends a corresponding certificate validity message (such as a signed OCSP response or a CRL) without a browser application being aware that the local application sent the response or that the request was intercepted. Doing so provides flexibility for the end user to run different browsers with the same result and also does not require users to update existing browser software. Further, delivering certificate status messages to a client through local channels allows the client to request a status of a digital certificate and receive a response with relatively low latency. That is, the techniques provide a way to send certificate validity messages to the browser application before the browser application needs the response. Because a response sent by the CA is in the cache of the local application, the browser application may receive the response with relatively low latency.

The following description relies on an antivirus application as a reference example of an application configured to distribute certificate status messages to a client. However, one of skill in the art will recognize other types of applications that monitor computer activity and intercept system calls related to certificate status requests are also applicable (e.g., applications related to computer security). Further, features of the embodiments disclosed herein may be implemented in a separate application that intercepts system calls related to determining the status of a digital certificate. Additionally, OCSP is used in this application as a reference example of a protocol used for confirming the status of a digital certificate. One of skill in the art will recognize that other methods of determining the status of a digital certificate may be applicable, such as the use of CRL services.

FIG. 1 illustrates an example computing environment 100, according to one embodiment. As shown, the computing environment includes a certificate authority server 115. Illustratively, certificate authority (CA) server 115 has several components, including an online certificate status protocol (OCSP) service 116 and certificate revocation list (CRL) service 116, a CA 117, and an application 118. Generally, the CA 117 component of CA server 115 manages and issues digital certificates to organizations. The digital certificates may be used to bind a particular domain (e.g., www.symantec.com) to a key named in a certificate. CA 117 may receive a request for a validity status of a digital certificate from a client, such as client computer 105. Such a request may be composed using the standard OCSP protocol. In turn, OCSP service 116 validates the digital certificate. OCSP service 116 generates and signs a corresponding OCSP response that indicates whether the certificate is valid, invalid, revoked, etc. Thereafter, CA server 117 (e.g., through application 118) sends the OCSP response to the requesting client via a network 120 (e.g., the Internet). As another example, such a request may correspond to a request for a certificate revocation list. CA server 117 (e.g., through CRL service 116) sends the CRL to the requesting client in response. Although FIG. 1 depicts the components of CA server 115 as residing in a single server, the components may reside on separate servers in a CA cloud 110. For example, the OCSP service 116 and the CRL service 116 typically reside on separate systems.

Client computer 105 includes a browser application 107 and an antivirus (AV) application 108. AV application 108 maintains a cache 109 that may include a set of malware definitions and attack signatures sent by an external server. AV application 108 may protect client computer 105 from computer viruses, malware attacks, and other forms of compromise by monitoring the activity (e.g., system calls) of client computer 105 and comparing such activity against the malware definitions and signatures. Further, AV application also compares the components against the malware definitions and signatures. When AV application 108 detects suspicious activity or potentially infected components, AV application may intercept any related system call, quarantine potentially infected files, and notify an end user of client computer 105. Periodically, the external server updates the malware definitions and attack signatures used by AV application 108.

Browser application 107 allows end users of client computer 105 to securely access a website. For example, SSL allows browser application 107 to verify the identity of a web server to ensure that the web server is what it purports to be. Generally, the website may present a digital certificate to browser application 107. In turn, browser application 107 may determine the validity of the certificate by requesting an OCSP response from CA server 110. CA server 110 sends an OCSP response to browser application. Occasionally, delays may occur between browser application 107 requesting the OCSP response and CA server 110 sending the response to browser application 107 (e.g., due to latency in CA cloud 110 or at the segments of network 120 connecting client computer 105 to CA server 115).

In one embodiment, to avoid such delays, AV application 108 may be configured to intercept and respond to OCSP requests made by browser application 107. To do so, the OCSP service 116 of CA server 115 generates new and/or updated OCSP responses for issued certificates and sends the generated responses to AV application 108 on a periodic basis (e.g., every three days). AV application 108 stores each response in cache 109. Thereafter, when browser application 107 sends an OCSP request to CA server 115, agent application 108 intercepts the request and determines whether the OCSP request corresponds to an OCSP response stored in local cache 109. If so, AV application 108 sends the cached response to browser application 107. If not, AV application 108 requests the corresponding OCSP response from CA server 109, sends the OCSP response to browser application 107, and caches the OCSP response.

Figure 2:
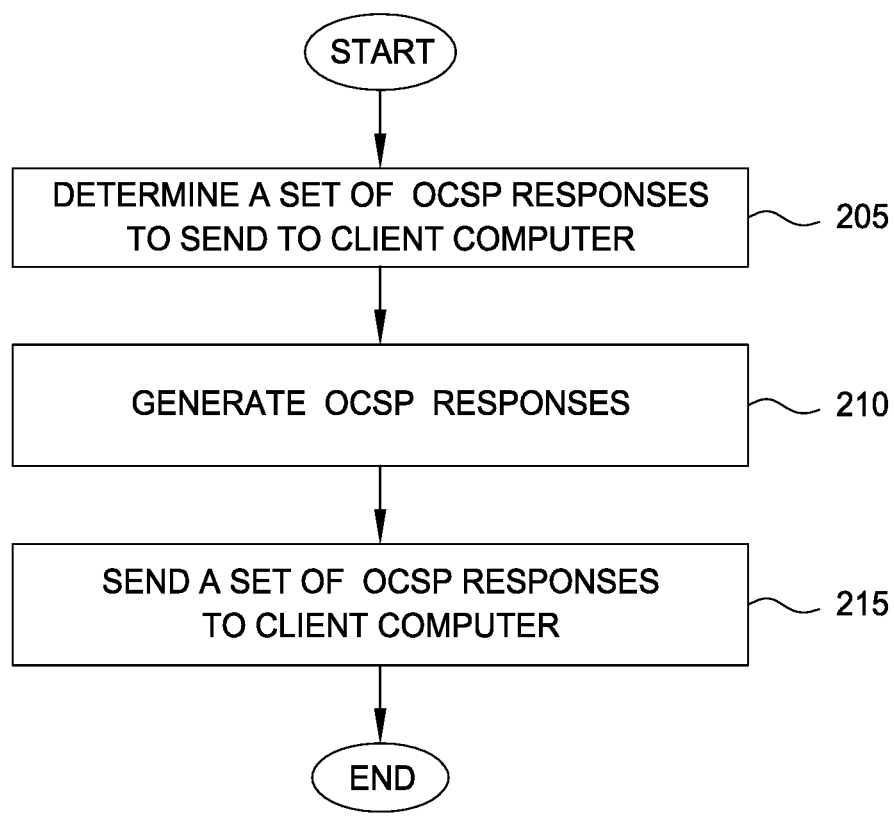
FIG. 2 illustrates a method for distributing online certificate status protocol (OCSP) responses to a client system, according to one embodiment.

FIG. 2 illustrates a method for distributing OCSP responses to a client system, according to one embodiment. More specifically, method 200 illustrates a CA server sending a set of OCSP responses to an AV application executing on the client system. Of course, the CA may be configured to send other types of certificate status validity messages (such as CRLs) to the AV application in the same manner. As shown, the method 200 begins at step 205, where the CA server determines a set of OCSP responses to send to the client. For example, the set may include OCSP responses that have been requested by the client in the past. As another example, the set may include the most frequently requested responses. To determine the most frequently requested responses, the CA may identify a distribution of OCSP responses for each certificate issued by that CA. The distribution may be further configured to account for other factors, such as OCSP responses in a particular geographical location. For example, the distribution may indicate that 90% of the OCSP requests in the United States correspond to 15% of the certificates managed by the certificate authority. In such a case, the set of OSCP responses pushed to the client AV application may correspond to the 15% certificates. At step 210, the CA server generates and signs OCSP responses for the identified set of OCSP responses. At step 215, the CA server sends the set of OCSP responses to the AV application on the client systems. Thereafter, the AV application on such clients may store the OCSP responses in the cache.

Further, the CA server may generate and send OCSP responses to client computers any time before an OCSP response expires (e.g., two days prior). Additionally, if a certificate is revoked, the CA server may generate and sign a new OCSP response indicating that the certificate is revoked and then send the new OCSP response to the client computers.

Figure 3:
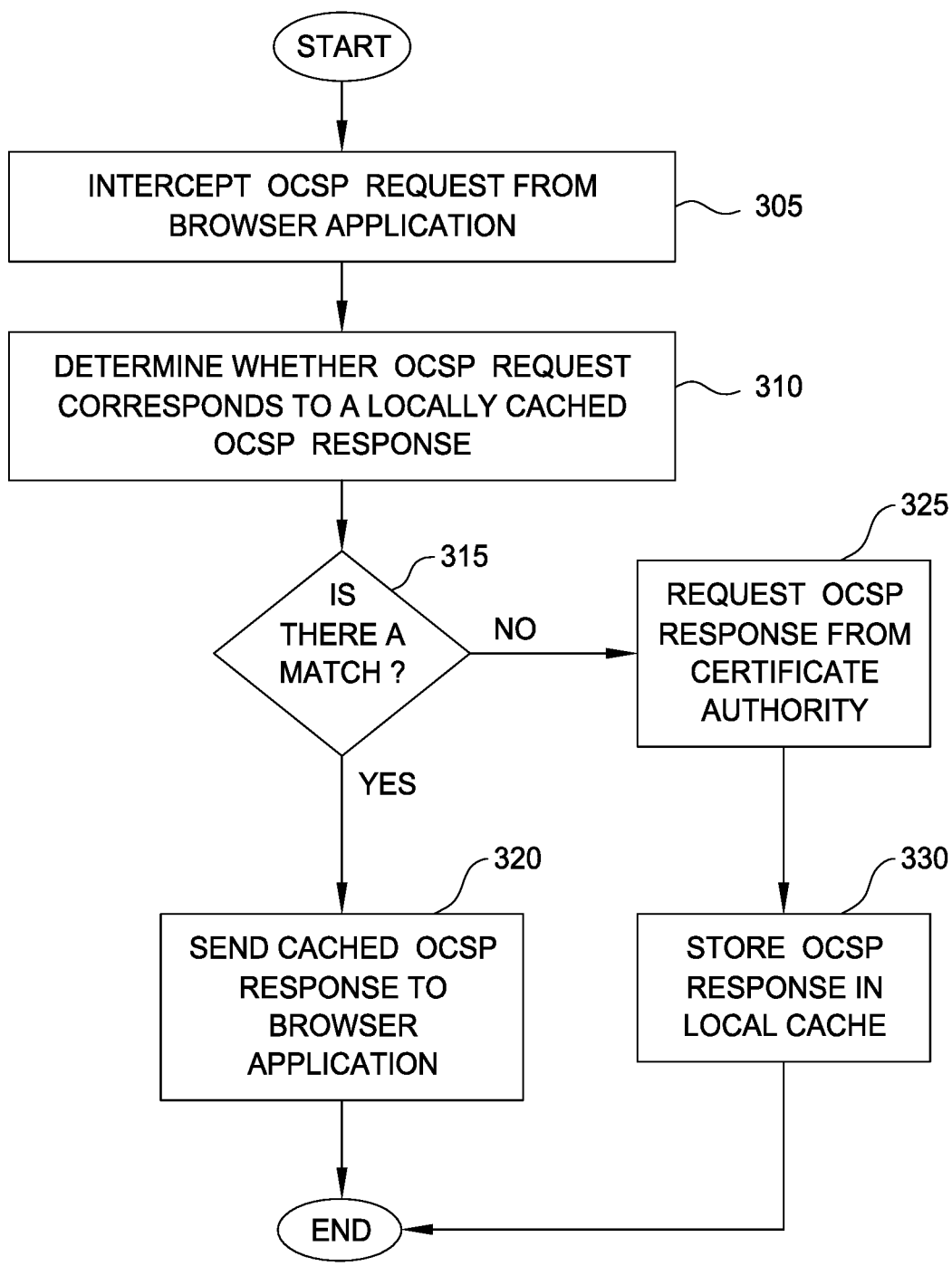
FIG. 3 illustrates a method for distributing OCSP responses to a browser application by a local agent application, according to one embodiment.

FIG. 3 illustrates a method 300 for distributing certificate status validity messages to a browser application via a local application, according to one embodiment. More specifically, method 300 describes the AV application delivering OCSP responses to the browser application upon request. Of course, the AV application may be configured to deliver other types of certificate status validity messages (such as CRLs) in the same manner. As shown, the method 300 begins at step 305, where the AV application intercepts an OCSP request made by the browser application. Typically, a digital certificate includes a pointer, such as a uniform resource identifier (URI), identifying a service that the browser application may direct a request to obtain the status of that certificate. The URI may point to a server that provides OCSP responses, e.g., https://ocsp.symantec.com. When the browser application accesses the URI of the certificate, the monitoring AV application may identify that the call corresponds to an OCSP request and therefore intercept the call. Intercepting the OCSP request bypasses the need to modify the code of the browser application.

At step 310, the AV application determines whether the OCSP request corresponds to a locally cached OCSP response. For example, OCSP responses include a URI corresponding to a URI provided in a certificate. Thus, the AV application may compare the URI from the OCSP request with the URI of cached OCSP responses. If a valid response exists in the cache (step 315), then the AV application sends the cached OCSP response to the browser application (step 320). Doing so alleviates the need for the browser application to connect to the OCSP service to request an OCSP response relative to the certificate. Otherwise, if a corresponding OCSP response is not present in the cache (step 325), the AV application requests the corresponding response from the CA server. The AV application receives the OCSP response from the CA server and sends the response to the browser application. The browser application receives the OCSP response without being aware that the AV application sent the response. At step 330, the AV application caches the response.

In one embodiment, the AV application caches responses for websites that the end user visits, even if the corresponding digital certificate is not among the set of OCSP responses automatically generated by the CA.

Further, a digital certificate may include multiple pointers (e.g., URIs) to different servers providing OCSP responses. In an alternative embodiment, the CA server may include a local server URI in each digital certificate, such as https://localhost:<port>. Thus, a digital certificate may direct the browser application to a local cache of OCSP responses. In one embodiment, the AV application may serve information from the local cache by listening on a specific port indicated by the URI specified in the digital certificate. The AV application may determine whether the cache includes an OCSP response corresponding to the certificate status request. If the corresponding response is cached, the AV application may retrieve the OCSP response from the cache and send the response to the browser. If not, the browser application may access a service identified by another one of the URIs in the digital certificate, according to method 300 above. Additionally, on startup, the browser application may initially confirm that the local cache of OCSP responses is available.

Figure 4:
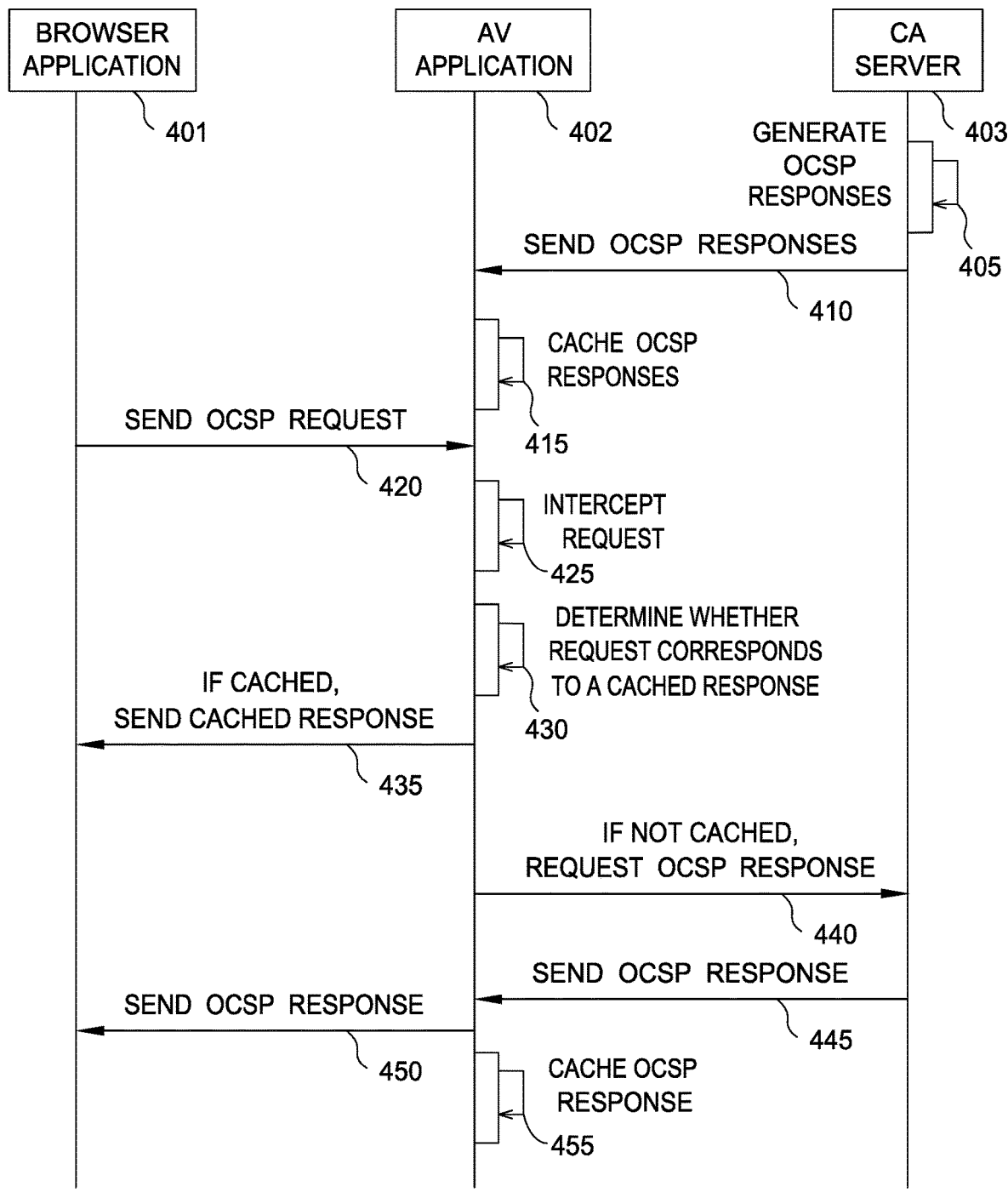
FIG. 4 illustrates a sequence diagram for distributing OCSP responses to a browser application on a client computer by a local agent application, according to one embodiment.

FIG. 4 illustrates a sequence diagram 400 for distributing OCSP responses to a browser application 401 on a client computer by an AV application 402, according to one embodiment. The sequence 400 begins when CA server 403 generates a set of signed OCSP responses to send to AV application 402 (at 405). As stated, the OCSP responses may correspond to a set of responses for digital certificates issued by CA server 403. CA server 403 may determine the subset, for example, based on how frequently relying parties request OCSP responses for certain digital certificates. At 410, CA server 403 sends the signed OCSP responses to AV application 402. At 415, AV application 402 caches the OCSP responses.

At 420, browser application 401 sends an OCSP request targeted to CA server 403 for a particular digital certificate. For example, a web server may present a digital certificate to browser application 401, which in turn determines the certificate status by calling a URI provided in the certificate. At 425, AV application 402 intercepts the request of the browser application 401. At 430, AV application 402 determines whether the OCSP request corresponds to a response in the cache of AV application 402 (e.g., by identifying a URI in the response that matches the URI in the request). Once AV application 402 determines that the OCSP response is cached, AV application 402 sends the cached response to browser application 401 (at 435).

At 440, if the OCSP response is not cached, AV application 402 requests the corresponding response from CA server 403. At 445, CA server 403 sends the corresponding OCSP response to AV application. AV application 402 sends the OCSP response to browser application 401 (at 450) and caches the OCSP response (at 455).

Figure 5:
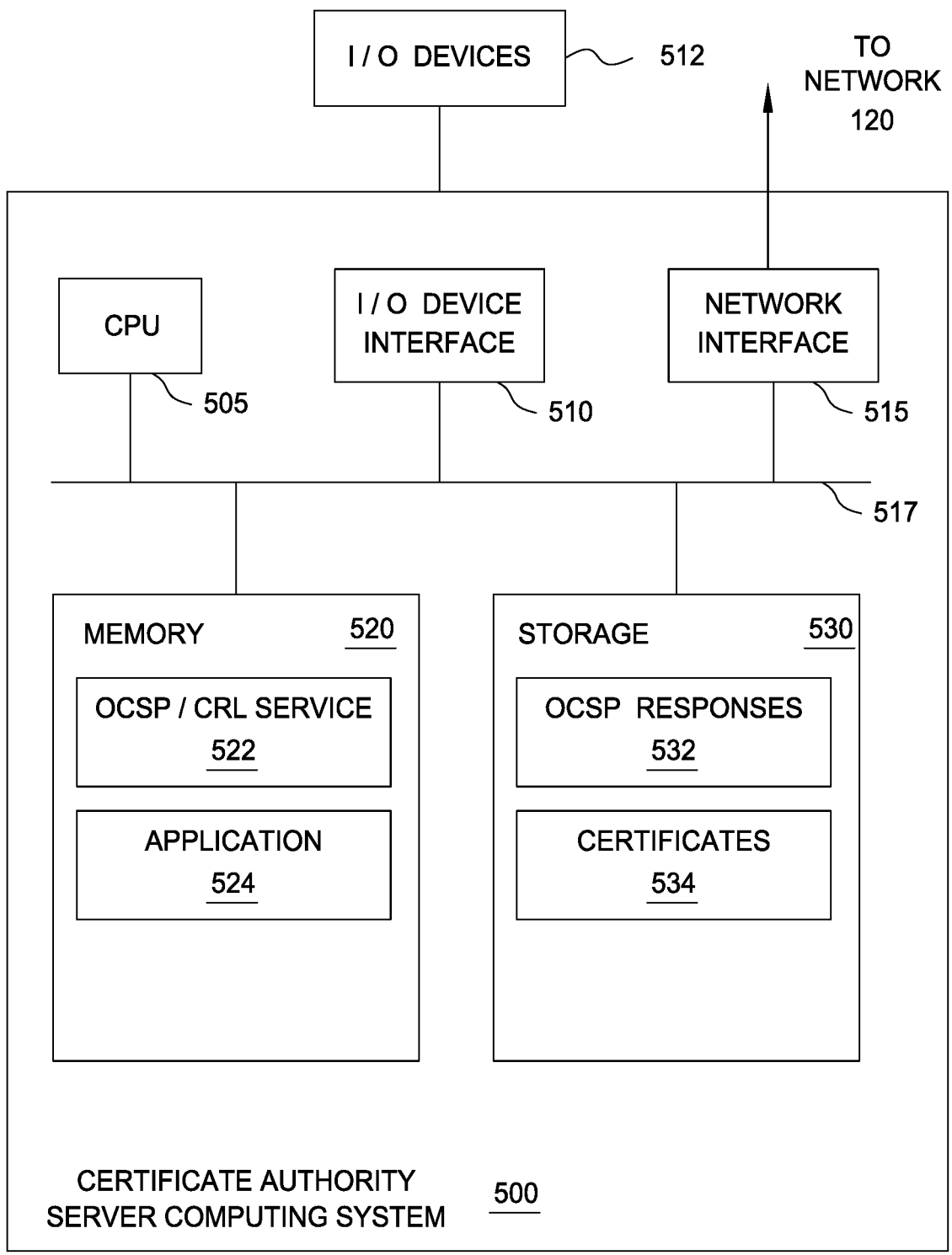
FIG. 5 illustrates an example computing system configured to generate signed OCSP responses to send to a local agent application, according to one embodiment.

FIG. 5 illustrates an example computing system 500 configured to generate signed OCSP responses to send to an AV application, according to one embodiment. As shown, computing system 500 includes, without limitation, a central processing unit (CPU) 505, a network interface 515, a network interface 515, a memory 520, and storage 530, each connected to a bus 517. Computing system 500 may also include an I/O device interface 510 connecting I/O devices 512 (e.g., keyboard, display and mouse devices) to the computing system 500. Further, in context of this disclosure, the computing elements shown in computing system 500 may correspond to a physical computing system (e.g., a system in a data center) or may be a virtual computing instance executing within a computing cloud.

CPU 505 retrieves and executes programming instructions stored in memory 520 as well as stores and retrieves application data residing in the storage 530. The interconnect 517 is used to transmit programming instructions and application data between CPU 505, I/O devices interface 510, storage 530, network interface 515, and memory 520. Note, CPU 505 is included to be representative of a single CPU, multiple CPUs, a single CPU having multiple processing cores, and the like. Memory 520 is generally included to be representative of a random access memory. Storage 530 may be a disk drive storage device. Although shown as a single unit, storage 530 may be a combination of fixed and/or removable storage devices, such as fixed disc drives, removable memory cards, or optical storage, network attached storage (NAS), or a storage area-network (SAN).

Illustratively, memory 520 includes an OCSP/CRL service 522 and an application 524. Storage 530 includes OCSP responses 532 and certificates 534. Application 524 generally provides one or more software applications and/or computing resources accessed over a network 120. Further, application 524 determines a subset of certificates 534 of which OCSP responses are frequently generated. OCSP/CRL service 522 generates OCSP responses 532 (or a CRL) based on the identified subset to send to the AV application on a client computer. Further, OCSP/CRL service 522 maintains a list of revoked certificates 534. When one of the certificates 532 is revoked or a certain OCSP response issued to the AV application, OCSP service 522 generates updated OCSP responses and sends the responses to the AV application.

Figure 6:
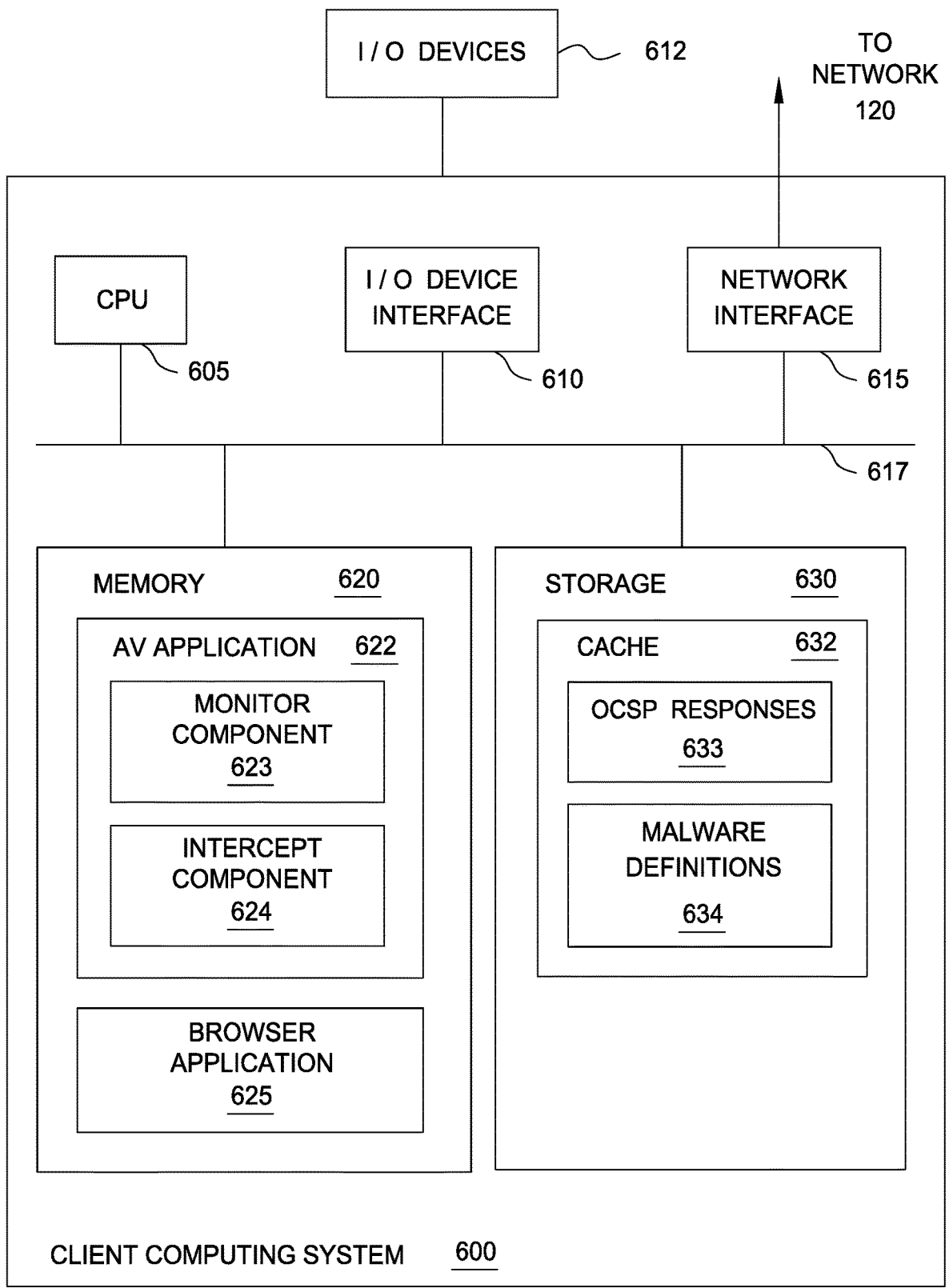
FIG. 6 illustrates an example computing system configured to cache OCSP responses to distribute to a browser application upon request, according to one embodiment.

FIG. 6 illustrates an example client computing system 600 configured to cache OCSP responses locally to distribute to a browser application upon request, according to one embodiment. As shown, computing system 600 includes, without limitation, a central processing unit (CPU) 605, a network interface 615, a network interface 615, a memory 620, and storage 630, each connected to a bus 617. Computing system 600 may also include an I/O device interface 610 connecting I/O devices 612 (e.g., keyboard, display and mouse devices) to the computing system 600. Further, in context of this disclosure, the computing elements shown in computing system 600 may correspond to a physical computing system (e.g., a system in a data center) or may be a virtual computing instance executing within a computing cloud.

CPU 605 retrieves and executes programming instructions stored in memory 620 as well as stores and retrieves application data residing in the storage 630. The interconnect 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes an AV application 622 and a browser application 625. Storage 630 includes a cache 632 that itself includes OCSP responses 633 and malware definitions 634. AV application 622 is a security program that includes a monitor component 623 and an intercept component 624. Monitor component 623 detects suspicious activity that matches malware definitions 634. When monitor component 623 detects such activity, intercept component 624 may interrupt the activity and notify an end user of the activity matching malware definitions 634.

In one embodiment, the computing system 600 receives OCSP responses 633 on a periodic basis from a CA and store the responses in cache 632. In addition to detecting suspicious activity in computing system 600, monitor component 623 may also detect instances where browser application 625 sends an OCSP request to a CA. When monitor component 622 detects browser application 625 attempting to send an OCSP request to the CA, intercept component 624 prevents the request from being transmitted to the CA. AV application 622 searches the OCSP responses 633 stored in cache 632 to identify a response corresponding to the request. AV application 622 sends the OCSP response to browser application 625 if the response is stored in cache 632. However, if not, AV application 622 communicates with the CA to retrieve the corresponding OCSP response.

As described, embodiments presented herein provide techniques for distributing OCSP responses to a client locally. A security application, such as an antivirus application, acts as an agent and receives OCSP responses sent by a CA. Thereafter, when a browser application, for example, requests an OCSP response from the CA, the antivirus application intercepts the request and serves a cached request to the browser application. Advantageously, this approach does not require any modification to the browser application itself. Further, because the OCSP responses are distributed locally, this approach reduces the time between a browser application sending an OCSP request and the browser application receiving the corresponding OCSP response.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim (s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present disclosure, certificate authority services (e.g., OCSP services and CRL servers) may be situated in a cloud network.

While the foregoing is directed to embodiments of the present invention, other and further embodiments of the invention may be devised without departing from the basic scope thereof, and the scope thereof is determined by the claims that follow.

What is claimed is:

1. A method for distributing online certificate status protocol responses a client computing device, the method comprising:
   identifying a distribution of digital certificates, wherein the distribution is based at least in part on a frequency at which certificate status validity messages corresponding to the digital certificates have been requested by a plurality of clients;
   identifying, via a processor, a set of digital certificates based at least in part on the distribution of digital certificates;
   generating a set of Online Certificate Status Protocol (OCSP) responses to send to a client computing device, wherein the set of OCSP responses corresponds to the set of digital certificates; and
   sending the set of OCSP responses to the client computing device prior to the client computing device requesting the set of OCSP responses, wherein the client computing device stores the set of OCSP responses,
   wherein the client computing device includes an agent application configured to receive the set of OCSP responses.

2. The method of claim 1, wherein the set of OCSP responses is a certificate revocation list.

3. The method of claim 1, wherein the client computing device includes an antivirus application configured to receive the set of OCSP responses.

4. The method of claim 1, wherein at least one of the set of OCSP responses includes a local server URI, the local server URI indicating a particular port on which the agent application is configured to listen to receive the set of OCSP responses.

5. The method of claim 1, wherein the distribution of digital certificates is further based at least in part on a geographical location of the plurality of clients that have requested certificate status validity messages corresponding to the digital certificates.

6. The method of claim 1, wherein generating the set of OCSP responses comprises generating a distinct OCSP response for each digital certificate of the set of digital certificates.

7. The method of claim 1, wherein the distribution of digital certificates is further based at least in part on revocation of the digital certificates.

8. Non-transitory computer-readable storage media storing instructions, which, when executed by a system of one or more processors, cause the system to perform operations comprising:
   identifying a distribution of digital certificates, wherein the distribution is based at least in part on a frequency at which certificate status validity messages corresponding to the digital certificates have been requested by a plurality of clients;
   identifying a set of digital certificates based at least in part on the distribution of digital certificates;
   generating a set of Online Certificate Status Protocol (OCSP) responses to send to a client computing device, wherein the set of OCSP responses corresponds to the set of digital certificates; and
   sending the set of OCSP responses to the client computing device prior to the client computing device requesting the set of OCSP responses, wherein the client computing device stores the set of OCSP responses,
   wherein the client computing device includes an agent application configured to receive the set of OCSP responses.

9. The non-transitory computer-readable storage media of claim 8, wherein the set of OCSP responses is a certificate revocation list.

10. The non-transitory computer-readable storage media of claim 8, wherein the client computing device includes an antivirus application configured to receive the set of OCSP responses.

11. The non-transitory computer-readable storage media of claim 8, wherein at least one of the set of OCSP responses includes a local server URI, the local server URI indicating a particular port on which the agent application is configured to listen to receive the set of OCSP responses.

12. The non-transitory computer-readable storage media of claim 8, wherein the distribution of digital certificates is further based at least in part on a geographical location of the plurality of clients that have requested certificate status validity messages corresponding to the digital certificates.

13. The non-transitory computer-readable storage media of claim 8, wherein generating the set of OCSP responses comprises generating a distinct OCSP response for each digital certificate of the set of digital certificates.

14. The non-transitory computer-readable storage media of claim 8, wherein wherein the distribution of digital certificates is further based at least in part on revocation of the digital certificates.

15. A system comprising one or more processors and non-transitory computer-readable storage media storing instructions, which, when executed by the one or more processors, cause the one or more processors to perform operations comprising:
    identifying a distribution of digital certificates, wherein the distribution is based at least in part on a frequency at which certificate status validity messages corresponding to the digital certificates have been requested by a plurality of clients;
    identifying a set of digital certificates based at least in part on the distribution of digital certificates;
    generating a set of Online Certificate Status Protocol (OCSP) responses to send to a client computing device, wherein the set of OCSP responses corresponds to the set of digital certificates; and
    sending the set of OCSP responses to the client computing device prior to the client computing device requesting the set of OCSP responses, wherein the client computing device stores the set of OCSP responses,
    wherein the client computing device includes an agent application configured to receive the set of OCSP responses.

16. The system of claim 15, wherein the set of OCSP responses is a certificate revocation list.

17. The system of claim 15, wherein the client computing device computer includes an antivirus application configured to receive the set of OCSP responses.

18. The system of claim 15, wherein the distribution of digital certificates is further based at least in part on a geographical location of the plurality of clients that have requested certificate status validity messages corresponding to the digital certificates.

19. The system of claim 15, wherein generating the set of OCSP responses comprises generating a distinct OCSP response for each digital certificate of the set of digital certificates.

* * * * *